(12) United States Patent
Pyle et al.

(10) Patent No.: US 8,402,030 B1
(45) Date of Patent: Mar. 19, 2013

(54) TEXTUAL DOCUMENT ANALYSIS USING WORD CLOUD COMPARISON

(75) Inventors: Joshua T. Pyle, Tucson, AZ (US); Nicholas W. Barrett, Oro Valley, AZ (US); Christopher Markley, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/301,005

(22) Filed: Nov. 21, 2011

(51) Int. Cl.
*G06F 7/00* (2006.01)
*G06F 17/30* (2006.01)

(52) U.S. Cl. .................. 707/738; 707/741; 707/749

(58) Field of Classification Search .............. 707/738
See application file for complete search history.

(56) References Cited

U.S. PATENT DOCUMENTS

| | | | |
|---|---|---|---|
| 6,349,316 B2 * | 2/2002 | Fein et al. | 715/267 |
| 6,549,898 B1 * | 4/2003 | Inaba et al. | 715/255 |
| 6,654,739 B1 * | 11/2003 | Apte et al. | 1/1 |
| 6,704,698 B1 * | 3/2004 | Paulsen, Jr. et al. | 704/1 |
| 7,003,725 B2 * | 2/2006 | Castellanos et al. | 715/257 |
| 7,644,047 B2 * | 1/2010 | Assadian et al. | 706/1 |
| 7,814,105 B2 * | 10/2010 | Knepper et al. | 707/738 |
| 8,254,692 B2 * | 8/2012 | Ramachandrula et al. | 382/197 |
| 2004/0034660 A1 * | 2/2004 | Chen et al. | 707/104.1 |
| 2006/0206483 A1 * | 9/2006 | Knepper et al. | 707/7 |
| 2008/0154926 A1 * | 6/2008 | Newman | 707/100 |
| 2010/0005083 A1 * | 1/2010 | Morgana et al. | 707/5 |
| 2010/0138426 A1 * | 6/2010 | Nakayama et al. | 707/741 |
| 2011/0087668 A1 * | 4/2011 | Thomas et al. | 707/738 |

* cited by examiner

*Primary Examiner* — Binh V Ho
(74) *Attorney, Agent, or Firm* — Schwegman Lundberg & Woessner, P.A.

(57) ABSTRACT

A system and method textually analyze documents. A frequency distribution is generated for the documents, and an intersection between the documents is determined. For each word in the intersection, the frequency of the word in the first document is compared with the frequency of the word in the second document, and the lower frequency is selected. A similarity measure between the first document and the second document is determined as a function of a count of the words in the intersection, a count of the words in the second document, the selected lower frequencies, and the frequency distribution for the words in the second document.

17 Claims, 5 Drawing Sheets

```
chairman route electronics communication effects
state-of years st waltham customer systems
usa achieve homeland security glance admitted arrears
located glode ma command billion content swanson
intelligence the-art technology government
world-class showcases mission employees
raytheon offices capabilities william
solutions around services integration talented provides
markets aspiring throughout featured defense
cutting-edge sales innovation 2010 corporate
ceo specializing spanning sensing worldwide
aerospace leader
``` chairman route electronics communication effects state-of years st waltham customer systems usa achieve homeland security glance admited arrears located glode ma command billion content swanson intelligence the-art technology government world-class showcases mission employees raytheon offices capabilities william solutions around services integration talented provides markets aspiring throughout featured defense cutting-edge sales innovation 2010 corporate ceo specializing spanning sensing worldwide aerospace leader

TEXTUAL DOCUMENT ANALYSIS USING WORD CLOUD COMPARISON

TECHNICAL FIELD

The present disclosure relates to a system and method to compare the similarity of documents using a word cloud comparison.

BACKGROUND

In today's business environment, significant challenges exist when trying to efficiently process information and trying to find relevant content. Information is often difficult to visualize and understand, especially in large documents. The art would therefore benefit from a novel and efficient manner to locate and process relevant content.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, the challenges that exist in efficiently processing information and finding relevant content are addressed. Specifically, the embodiment combines sets of word clouds to visually represent like-sets of knowledge. A process and formula extend data to specific pages including a user's own pages based upon the preferences of the user.

Figure 1:
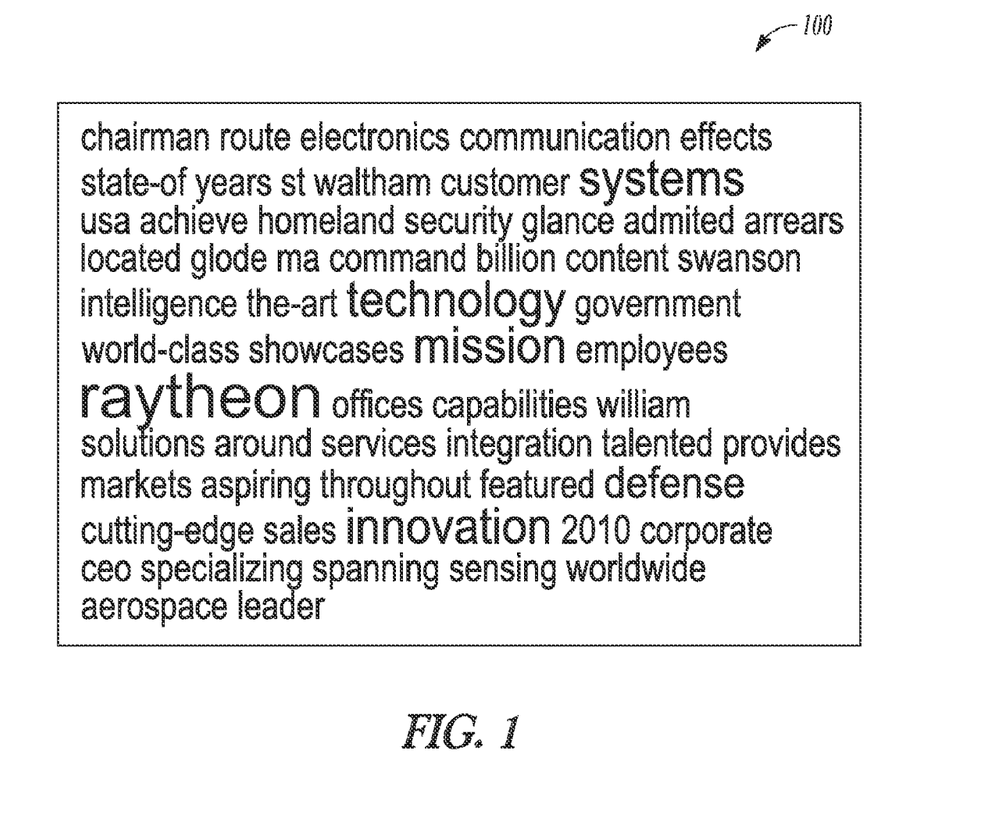
FIG. 1 illustrates an example of a word cloud.

A typical word cloud summarizes large sets of text so that significant words in the text stand out. FIG. 1 illustrates an example of a word cloud 100, wherein the significant words "Raytheon," "systems," "technology," "mission," "defense," and "innovation" stand out, to differing degrees, based on script-size. An embodiment uses such word clouds to find similar clouds, and hence similar documents. More specifically, the intersection of two word clouds (representing two different documents) are compared to find a relative and weighted percentage of how many words were in common between the two documents and how many important words were in common between the two documents. The result is a calculated relationship between the two documents indicating the similarity of the two documents.

Additionally, an embodiment provides a flexible method to synthesize information sources (e.g., news articles, budget documents, internal briefs, request for proposals, and trip reports) consisting of structured and semi-structured data elements. Correlation of the data between sources is accomplished by a process that utilizes an innovative implementation of word cloud combinatorial comparisons and string searches. The operation can be described in a mathematical formalism that expresses the relevancy of content between unstructured textual documents to identify words that are topically similar by using word stemming frequency analysis. An implementation of the process can be used to create a tool that allows a user to examine disparate information sources and to compare that information to users' preferences and pre-built preference sets for all content types in a system. One result is the ability to quickly prepare business development plans by leveraging a continually updated core base set of trusted data sources.

Figure 2A:
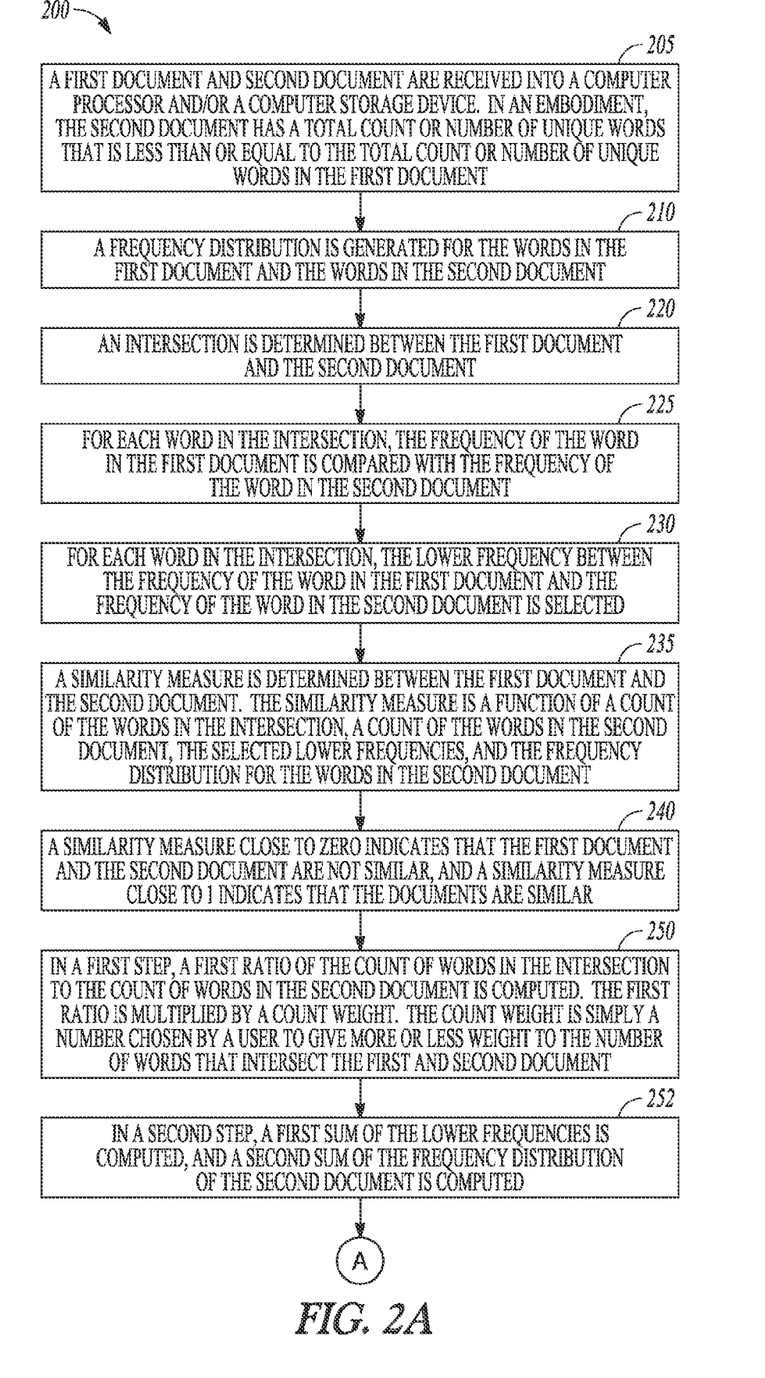
FIGS. 2A and 2B are a flowchart of a process to determine the similarity between two documents.
Figure 2B:
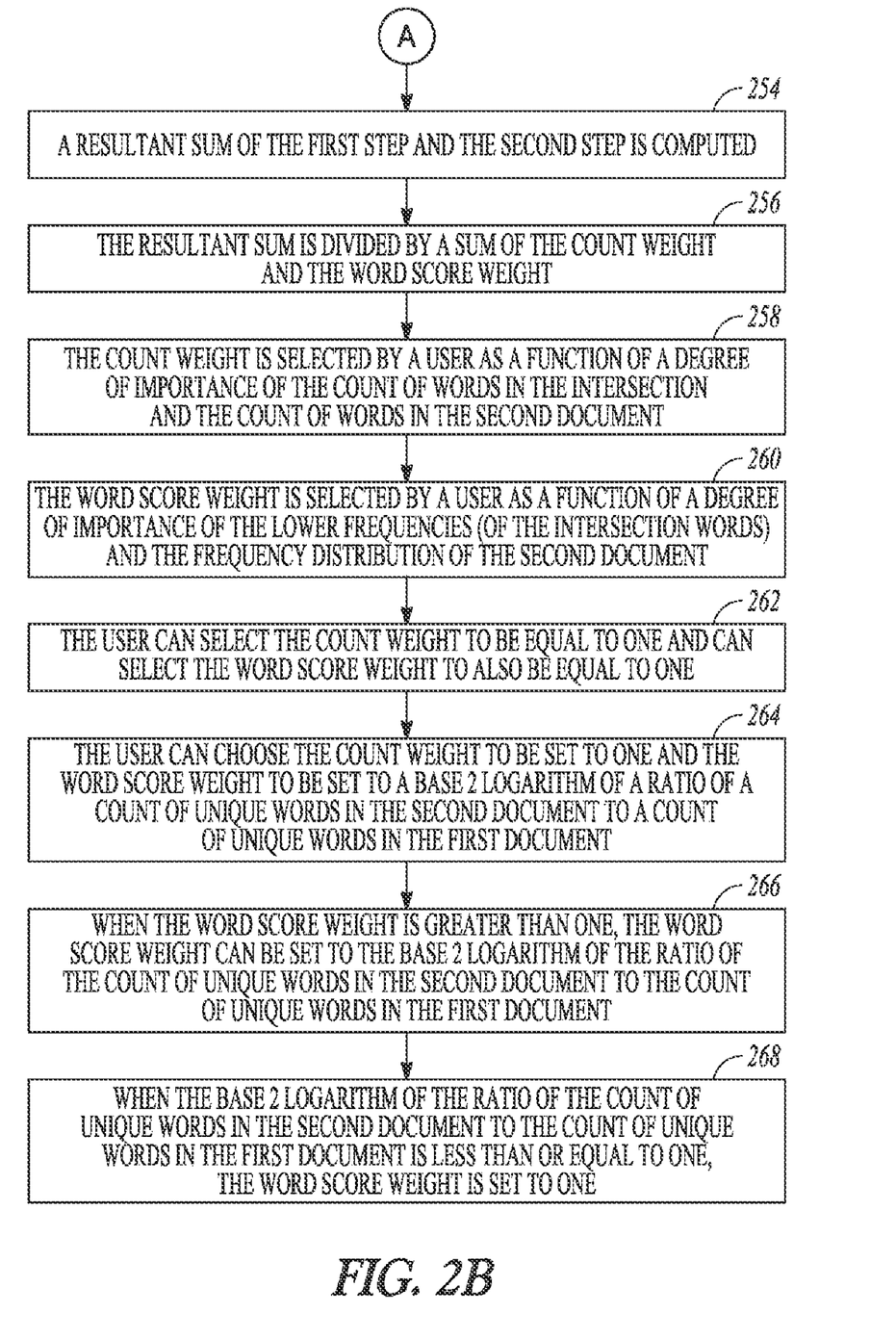

FIGS. 2A and 2B are a flowchart of an example process 200 for determining the similarity between two documents. FIGS. 2A and 2B include a number of process blocks 205-268. Though arranged serially in the example of FIGS. 2A and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 2A and 2B, at 205, a first document and second document are received into a computer processor and/or a computer storage device. In an embodiment, the second document has a total count or number of unique words that is less than or equal to the total count or number of unique words in the first document. A unique word means that a word is counted only once, and that additional occurrences of that particular word in the document do not add to the count of unique words. In an embodiment, two or more variations of a word with the same stem are counted as one word (e.g., a first occurrence of "telephone" will add to the total count of unique words, but a later occurrence of "telephonic" will not add to the total count of unique words).

Figure 3:
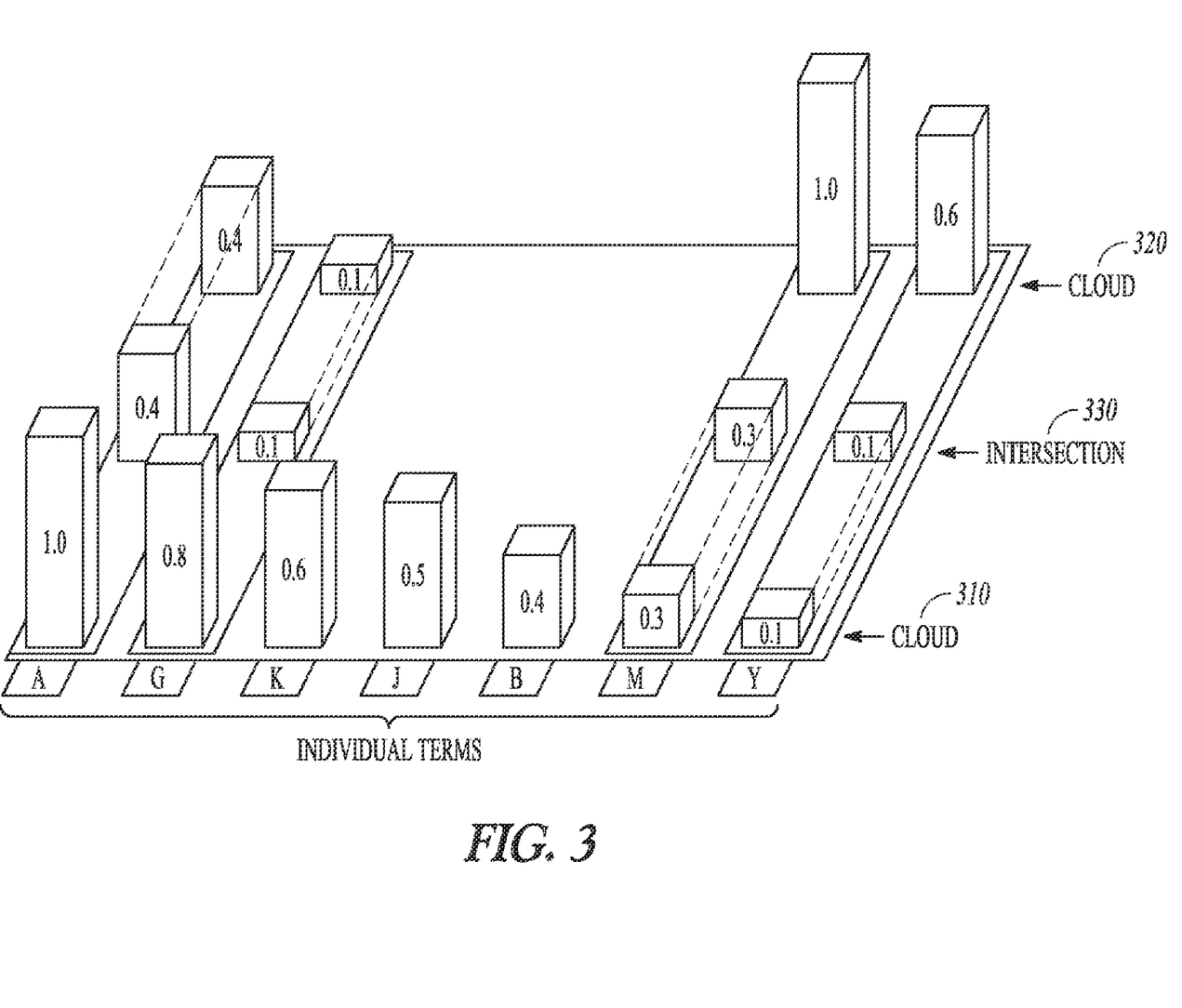
FIG. 3 is a graphic representation of a frequency distribution of the words in two documents.

At 210, a frequency distribution is generated for the words in the first document and the words in the second document. An example of such a frequency distribution is illustrated in FIG. 3. The frequency distribution of a first document is indicated by cloud 310, and the frequency distribution of the second document is indicated by cloud 320. For example, in cloud 310, the term A is the most frequently occurring term (indicated by 1.0) in the first document, and the term Y is the least frequently occurring term (indicated by 0.1) in the first document. Similarly, in cloud 320, term M is the most frequently occurring term in the second document (1.0), and term G (0.1) is the least frequently occurring term in the second document. In an embodiment, the most frequently occurring term will always be indicated by a value of 1.0, and the terms of lesser frequency will be indicated by some value less than 1.0.

At 220, an intersection (FIG. 3, No. 330) is determined between the first document and the second document. The intersection of two documents is a set of words that appears in both the first document and the second document. FIG. 3 illustrates that terms A, G, M, and Y are in the intersection of the first document and the second document, and terms K, J, and B are not in the intersection of the first document and second document. As indicated at 222, a word in the intersection is compared against a file of common words, and if the word appears in the file of common words, that word is not included in the intersection. Words in the common file may include such words as "the,", "and", "they," "he," "she," "it," and "therefore."

At 225, for each word in the intersection, the frequency of the word in the first document is compared with the frequency of the word in the second document, and at 230, for each word in the intersection, the lower frequency between the frequency of the word in the first document and the frequency of the word in the second document is selected. Referring again to FIG. 3, for term A for example, the lesser frequency of 0.4 from the second document is chosen over the frequency of 1.0 from the first document.

At 235, a similarity measure is determined between the first document and the second document. The similarity measure is a function of a count of the words in the intersection, a count of the words in the second document, the selected lower frequencies, and the frequency distribution for the words in the second document. The similarity measure can be expressed as follows:

$$\frac{\left(\frac{\sum_{i \in A \cap B} 1}{\sum_{j \in B} 1}\right)x + \left(\frac{\sum_{i \in A \cap B} w(i)}{\sum_{j \in B} w(j)}\right)y}{(x+y)}$$

In the above expression, A is the larger document, B is the smaller document, x is the word count weight, y is the word score weight, and w(i) and w(j) are the word score for the A document and B document respectively. As indicated at 240, a similarity measure close to zero indicates that the first document and the second document are not similar, and a similarity measure close to 1 indicates that the documents are similar.

Blocks 250-256 provide further details of what is involved in determining the similarity measure. At 250, in a first step, a first ratio of the count of words in the intersection to the count of words in the second document is computed. The first ratio is multiplied by a count weight. The count weight is simply a number chosen by a user to give more or less weight to the number of words that intersect the first and second document. At 252, in a second step, a first sum of the lower frequencies is computed, and a second sum of the frequency distribution of the second document is computed. For example, referring to FIG. 3, the first sum of lower frequencies would be equal to 0.9 (0.4+0.1+0.3+0.1), and the second sum would be equal to 2.1 (0.4+0.1+1.0+0.6). A second ratio of the first sum to the second sum is computed, and the second ratio is multiplied by a word score weight. The word score weight, like the word count weight, is simply a number chosen by a user to give more or less weight to the frequency distribution of the terms in the two documents. So, if a user would like more weight to be applied the count of unique words in the documents, a greater value would be given to the count weight than to the word score weight. In contrast, if a user would like more weight to be given to the frequency distribution of the terms in the two documents, then a greater value will be given to the word score weight than the word count weight. At 254, a resultant sum of the first step and the second step is computed. At 256, the resultant sum is divided by a sum of the count weight and the word score weight.

As previously noted, and as now noted at 258, the count weight is selected by a user as a function of a degree of importance of the count of words in the intersection and the count of words in the second document. At 260, the word score weight is selected by a user as a function of a degree of importance of the lower frequencies (of the intersection words) and the frequency distribution of the second document. If the user places no particular importance on either the total counts of words in the two documents or the frequency distributions of the words in the two documents, then as indicated at 262, the user can select the count weight to be equal to one and can select the word score weight to also be equal to one (or to any other equal values).

In a different embodiment, as indicated at 264, the user can choose the count weight to be set to one and the word score weight to be set to a base 2 logarithm of a ratio of a count of unique words in the second document to a count of unique words in the first document. This feature can be represented as follows:

$$y = \log_2\left(\frac{\sum_{j \in B} 1}{\sum_{j \in A} 1}\right)$$

In yet another embodiment, as indicated at 266, when the word score weight is greater than one, the word score weight can be set to the base 2 logarithm of the ratio of the count of unique words in the second document to the count of unique words in the first document. Or, as indicated at 268, when the base 2 logarithm of the ratio of the count of unique words in the second document to the count of unique words in the first document is less than or equal to one, the word score weight is set to one. This feature can be represented as follows:

$$y=(y>1)\rightarrow y\char`\^(y<=1)\rightarrow 1$$

Figure 4:
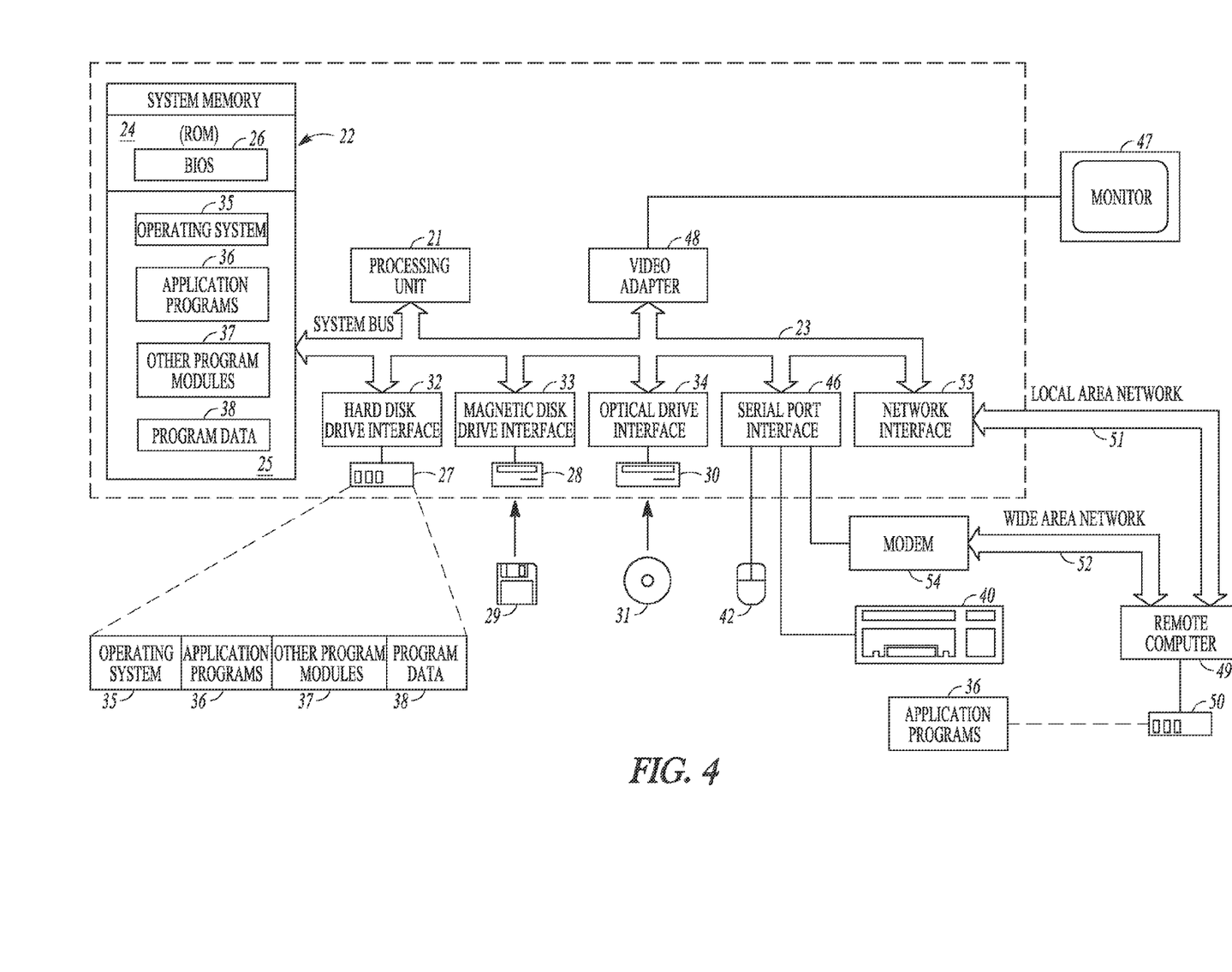
FIG. 4 is a block diagram of a computer processor system upon which one or more embodiments of the present disclosure can execute.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Example Embodiments

Several embodiments and sub-embodiments have been disclosed above, and it is envisioned that any embodiment can be combined with any other embodiment or sub-embodiment. Specific examples of such combinations are illustrated in the examples below.

Example No. 1 is a method including receiving into a computer processor a first document and a second document. The second document includes a count of words less than or equal to a count of words in the first document. The method further includes generating using the computer processor a frequency distribution for the words in the first document and a frequency distribution for the words in the second document, and determining with the computer processor an intersection of the first document and the second document. The intersection is a set of words that appear in both the first document and the second document. The method further includes, for each word in the intersection, comparing with the computer processor the frequency of the word in the first document with the frequency of the word in the second document, and for each word in the intersection, selecting with the computer processor the lower frequency between the frequency of the word in the first document and the frequency of the word in the second document. The method also includes determining with the computer processor a similarity measure between the first document and the second document as a function of a count of the words in the intersection, a count of the words in the second document, the selected lower frequencies, and the frequency distribution for the words in the second document.

Example No. 2 includes the features of Example No. 1, and optionally includes a method wherein a similarity measure close to zero indicates that the first document and the second document are not similar, and a similarity measure close to 1 indicates that the documents are similar.

Example No. 3 includes the features of Example Nos. 1-2, and optionally includes comparing a word in the intersection against a file of words, and removing the word from the intersection when the word appears in the file of words.

Example No. 4 includes the features of Example Nos. 1-3, and optionally includes a method wherein determining the similarity measure includes (a) computing a first ratio of the count of words in the intersection to the count of words in the second document, and multiplying the first ratio by a count weight; (b) computing a first sum of the lower frequencies, computing a second sum of the frequency distribution of the second document, computing a second ratio of the first sum to the second sum, and multiplying the second ratio by a word score weight; (c) computing a resultant sum of step (a) and step (b); and (d) dividing the resultant sum by a sum of the count weight and the word score weight.

Example No. 5 includes the features of Example Nos. 1-4, and optionally includes a method wherein the count weight is selected as a function of a degree of importance of the count of words in the intersection and the count of words in the second document.

Example No. 6 includes the features of Example Nos. 1-5, and optionally includes a method wherein the word score weight is selected as a function of a degree of importance of the lower frequencies and the frequency distribution of the second document.

Example No. 7 includes the features of Example Nos. 1-6, and optionally includes a method wherein the count weight is equal to one and the word score weight is equal to one.

Example No. 8 includes the features of Example Nos. 1-7, and optionally includes a method wherein the count weight is set to one and the word score weight is set to a base 2 logarithm of a ratio of a count of unique words in the second document to a count of unique words in the first document.

Example No. 9 includes the features of Example Nos. 1-8, and optionally includes a method wherein the word score weight is set to the base 2 logarithm of the ratio of the count of unique words in the second document to the count of unique words in the first document when the word score weight is greater than one, and the word score weight is set to one when the base 2 logarithm of the ratio of the count of unique words in the second document to the count of unique words in the first document is less than or equal to one.

Example No. 10 is a computer readable storage device including instructions that when executed by a processor execute a process comprising receiving a first document and a second document. The second document includes a count of words less than or equal to a count of words in the first document. The computer readable storage device also includes instructions for generating a frequency distribution for the words in the first document and a frequency distribution for the words in the second document, and determining an intersection of the first document and the second document. The intersection includes a set of words that appear in both the first document and the second document. The computer readable storage device also includes instructions for comparing, for each word in the intersection, the frequency of the word in the first document with the frequency of the word in the second document, and instructions for selecting, for each word in the intersection, the lower frequency between the frequency of the word in the first document and the frequency of the word in the second document. The computer readable storage device includes instructions for determining a similarity measure between the first document and the second document as a function of a count of the words in the intersection, a count of the words in the second document, the selected lower frequencies, and the frequency distribution for the words in the second document.

Example No. 11 includes the features of Example No. 10 and optionally includes instructions for comparing a word in the intersection against a file of words, and removing the word from the intersection when the word appears in the file of words.

Example No. 12 includes the features of Example Nos. 10-11 and optionally includes instructions for (a) computing a first ratio of the count of words in the intersection to the count of words in the second document, and multiplying the first ratio by a count weight; (b) computing a first sum of the lower frequencies, computing a second sum of the frequency distribution of the second document, computing a second ratio of the first sum to the second sum, and multiplying the second ratio by a word score weight; (c) computing a resultant sum of step (a) and step (b); and (d) dividing the resultant sum by a sum of the count weight and the word score weight.

Example No. 13 includes the features of Example Nos. 10-12 and optionally includes a computer readable storage device wherein the count weight is selected as a function of a degree of importance of the count of words in the intersection and the count of words in the second document; and wherein the word score weight is selected as a function of a degree of importance of the lower frequencies and the frequency distribution of the second document.

Example No. 14 includes the features of Example Nos. 10-13 and optionally includes a computer readable storage device wherein the count weight is set to one and the word score weight is set to a base 2 logarithm of a ratio of a count of unique words in the second document to a count of unique words in the first document.

Example No. 15 includes the features of Example Nos. 10-14 and optionally includes a computer readable storage device wherein the word score weight is set to the base 2 logarithm of the ratio of the count of unique words in the second document to the count of unique words in the first document when the word score weight is greater than one, and the word score weight is set to one when the base 2 logarithm of the ratio of the count of unique words in the second document to the count of unique words in the first document is less than or equal to one.

Example No. 16 is a system including a computer processor configured for receiving a first document and a second document. The second document includes a count of words less than or equal to a count of words in the first document. The system includes a computer processor configured for generating a frequency distribution for the words in the first document and a frequency distribution for the words in the second document, and determining an intersection of the first document and the second document. The intersection includes a set of words that appear in both the first document and the second document. The system includes a computer processor configured for comparing, for each word in the intersection, the frequency of the word in the first document with the frequency of the word in the second document; and a computer processor configured for selecting, for each word in the intersection, the lower frequency between the frequency of the word in the first document and the frequency of the word in the second document. The system further includes a computer processor configured for determining a similarity measure between the first document and the second document as a function of a count of the words in the intersection, a count of the words in the second document, the selected lower frequencies, and the frequency distribution for the words in the second document.

Example No. 17 includes the features of Example No. 16 and optionally includes a computer processor configured for comparing a word in the intersection against a file of words, and removing the word from the intersection when the word appears in the file of words.

Example No. 18 includes the features of Example Nos. 16-17 and optionally includes a computer processor configured for (a) computing a first ratio of the count of words in the intersection to the count of words in the second document, and multiplying the first ratio by a count weight; (b) computing a first sum of the lower frequencies, computing a second sum of the frequency distribution of the second document, computing a second ratio of the first sum to the second sum, and multiplying the second ratio by a word score weight; (c) computing a resultant sum of step (a) and step (b); and (d) dividing the resultant sum by a sum of the count weight and the word score weight.

Example No. 19 includes the features of Example Nos. 16-18 and optionally includes a system wherein the count weight is selected as a function of a degree of importance of the count of words in the intersection and the count of words in the second document; and wherein the word score weight is selected as a function of a degree of importance of the lower frequencies and the frequency distribution of the second document.

Example No. 20 includes the features of Example Nos. 16-19 and optionally includes a system wherein the count weight is set to one and the word score weight is set to a base 2 logarithm of a ratio of a count of unique words in the second document to a count of unique words in the first document.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method comprising:
receiving into a computer processor a first document and a second document, the second document comprising a count of words less than or equal to a count of words in the first document;
generating using the computer processor a frequency distribution for the words in the first document and a frequency distribution for the words in the second document;
determining with the computer processor an intersection of the first document and the second document, the intersection comprising a set of words that appear in both the first document and the second document;
for each word in the intersection, comparing with the computer processor the frequency of the word in the first document with the frequency of the word in the second document;
for each word in the intersection, selecting with the computer processor the lower frequency between the frequency of the word in the first document and the frequency of the word in the second document; and
determining with the computer processor a similarity measure between the first document and the second document as a function of a count of the words in the intersection, a count of the words in the second document, the selected lower frequencies, and the frequency distribution for the words in the second document;
wherein determining the similarity measure comprises:
(a) computing a first ratio of the count of words in the intersection to the count of words in the second document, and multiplying the first ratio by a count weight;
(b) computing a first sum of the lower frequencies, computing a second sum of the frequency distribution of the second document, computing a second ratio of the first sum to the second sum, and multiplying the second ratio by a word score weight;
(c) computing a resultant sum of step (a) and step (b); and
(d) dividing the resultant sum by a sum of the count weight and the word score weight.

2. The method of claim 1, wherein a similarity measure close to zero indicates that the first document and the second document are not similar, and a similarity measure close to 1 indicates that the documents are similar.

3. The method of claim 1, comprising comparing a word in the intersection against a file of words, and removing the word from the intersection when the word appears in the file of words.

4. The method of claim 1, wherein the count weight is selected as a function of a degree of importance of the count of words in the intersection and the count of words in the second document.

5. The method of claim 1, wherein the word score weight is selected as a function of a degree of importance of the lower frequencies and the frequency distribution of the second document.

6. The method of claim 1, wherein the count weight is equal to one and the word score weight is equal to one.

7. The method of claim 1, wherein the count weight is set to one and the word score weight is set to a base 2 logarithm of a ratio of a count of unique words in the second document to a count of unique words in the first document.

8. The method of claim 7, wherein the word score weight is set to the base 2 logarithm of the ratio of the count of unique words in the second document to the count of unique words in the first document when the word score weight is greater than one, and the word score weight is set to one when the base 2 logarithm of the ratio of the count of unique words in the second document to the count of unique words in the first document is less than or equal to one.

9. A computer readable storage device comprising instructions that when executed by a processor execute a process comprising:
receiving a first document and a second document, the second document comprising a count of words less than or equal to a count of words in the first document;
generating a frequency distribution for the words in the first document and a frequency distribution for the words in the second document;

determining an intersection of the first document and the second document, the intersection comprising a set of words that appear in both the first document and the second document;

for each word in the intersection, comparing the frequency of the word in the first document with the frequency of the word in the second document;

for each word in the intersection, selecting the lower frequency between the frequency of the word in the first document and the frequency of the word in the second document; and determining a similarity measure between the first document and the second document as a function of a count of the words in the intersection, a count of the words in the second document, the selected lower frequencies, and the frequency distribution for the words in the second document;

comprising instructions for:
(a) computing a first ratio of the count of words in the intersection to the count of words in the second document, and multiplying the first ratio by a count weight;
(b) computing a first sum of the lower frequencies, computing a second sum of the frequency distribution of the second document, computing a second ratio of the first sum to the second sum, and multiplying the second ratio by a word score weight;
(c) computing a resultant sum of step (a) and step (b); and
(d) dividing the resultant sum by a sum of the count weight and the word score weight.

10. The computer readable storage device of claim 9, comprising instructions for comparing a word in the intersection against a file of words, and removing the word from the intersection when the word appears in the file of words.

11. The computer readable storage device of claim 9, wherein the count weight is selected as a function of a degree of importance of the count of words in the intersection and the count of words in the second document; and wherein the word score weight is selected as a function of a degree of importance of the lower frequencies and the frequency distribution of the second document.

12. The computer readable storage device of claim 9, wherein the count weight is set to one and the word score weight is set to a base 2 logarithm of a ratio of a count of unique words in the second document to a count of unique words in the first document.

13. The computer readable storage device of claim 12, wherein the word score weight is set to the base 2 logarithm of the ratio of the count of unique words in the second document to the count of unique words in the first document when the word score weight is greater than one, and the word score weight is set to one when the base 2 logarithm of the ratio of the count of unique words in the second document to the count of unique words in the first document is less than or equal to one.

14. A system comprising:
a computer processor configured for:
receiving a first document and a second document, the second document comprising a count of words less than or equal to a count of words in the first document;

generating a frequency distribution for the words in the first document and a frequency distribution for the words in the second document;

determining an intersection of the first document and the second document, the intersection comprising a set of words that appear in both the first document and the second document;

for each word in the intersection, comparing the frequency of the word in the first document with the frequency of the word in the second document;

for each word in the intersection, selecting the lower frequency between the frequency of the word in the first document and the frequency of the word in the second document; and determining a similarity measure between the first document and the second document as a function of a count of the words in the intersection, a count of the words in the second document, the selected lower frequencies, and the frequency distribution for the words in the second document;

comprising a computer processor configured for:
(a) computing a first ratio of the count of words in the intersection to the count of words in the second document, and multiplying the first ratio by a count weight;
(b) computing a first sum of the lower frequencies, computing a second sum of the frequency distribution of the second document, computing a second ratio of the first sum to the second sum, and multiplying the second ratio by a word score weight;
(c) computing a resultant sum of step (a) and step (b); and
(d) dividing the resultant sum by a sum of the count weight and the word score weight.

15. The system of claim 14, comprising a computer processor configured for comparing a word in the intersection against a file of words, and removing the word from the intersection when the word appears in the file of words.

16. The system of claim 14, wherein the count weight is selected as a function of a degree of importance of the count of words in the intersection and the count of words in the second document; and wherein the word score weight is selected as a function of a degree of importance of the lower frequencies and the frequency distribution of the second document.

17. The system of claim 16, wherein the count weight is set to one and the word score weight is set to a base 2 logarithm of a ratio of a count of unique words in the second document to a count of unique words in the first document.

* * * * *